March 19, 1968  E. STAUTMEISTER  3,373,622
STEPPING TRANSMISSION
Filed May 21, 1965
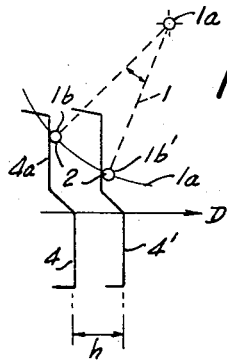
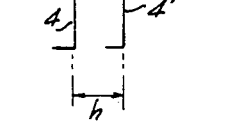
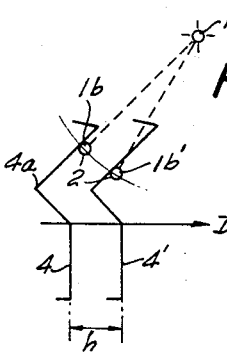
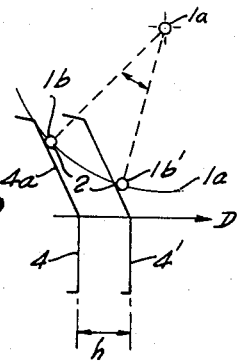
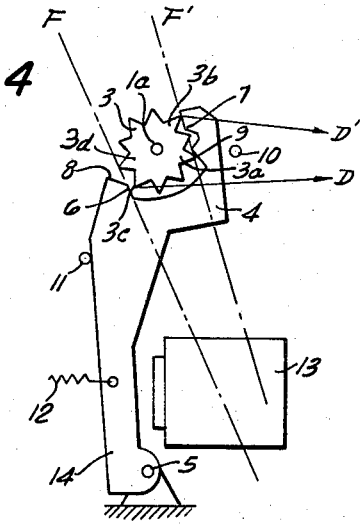
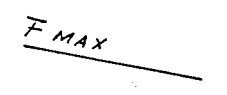
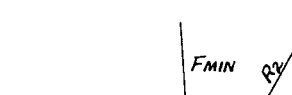
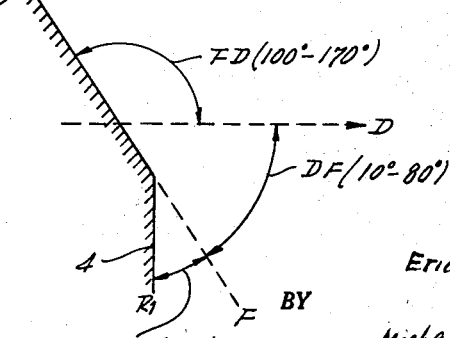
INVENTOR.
Erich Stautmeister
BY
Michael J. Striker United States Patent Office 3,373,622
Patented Mar. 19, 1968

3,373,622
STEPPING TRANSMISSION
Erich Stautmeister, Marburg, Germany, assignor to
Alfred Engelmann, Wennefostel, Germany
Filed May 21, 1965, Ser. No. 457,783
11 Claims. (Cl. 74—143)

ABSTRACT OF THE DISCLOSURE

A reciprocating pawl has a face successively engaging the teeth of a stepping wheel and inclined to the path of pawl movement to produce a great turning angle of the stepping wheel. The pawl is reciprocated by an electromagnet and a spring, and has two engaging faces slanted at different angles to the path of movement of the pawl in accordance with the characteristics of the electromagnet and spring. In a modified embodiment, one engaging face is angular or curved to vary the force required of the electromagnet.

---

Stepping transmissions in which the shifting pawl is operated by an electromagnetic means, are particularly used for the drive of registers in counters and meters. The register wheel of the lowest order is turned by the stepping transmission which transforms the translatory reciprocating motion of the armature of the electromagnetic means into a turning movement.

It is advantageous to use the element which is operated by the electromagnetic means, directly for engaging and shifting the stepping wheel, and to avoid additional transmission members. In constructions of this type, the armature of the electromagnetic means is constructed as a shifting pawl which directly cooperates with the stepping wheel.

As compared with drives in which an intermediate pawl is provided between the armature of the electromagnetic means and the stepping wheel, the direct connection between the armature acting as shifting pawl and a stepping wheel has the great advantage of simplicity, and less expensive manufacture. Nevertheless, constructions with intermediate pawls between the armature and the stepping wheel are widely used, because the intermediate pawl can be positioned and guided to move in a desired direction whereby different ratios can be obtained between the distance of movement of the armature, and the angle which the stepping wheel, and thereby the register wheel, turn.

It is an object of the present invention to provide a stepping transmission in which the ratio between the distance moved by the shifting pawl, which may be the armature of an electromagnetic means, and the turning angle of a stepping wheel operated by the shifting pawl, can be selected.

Another object of the invention is to use the reciprocating armature of an electromagnetic means for directly turning a stepping wheel through angular distances which are greater than the length of the stroke of the armature.

Another object of the invention is to provide a stepping transmission in which the transmission ratio is varied during a step so that the load applied to the operating means, for example to electromagnetic means or to spring means, is varied in accordance with the characteristics of the respective operating means. Another object of the invention is to provide a stepping mechanism in which a reciprocating shifting pawl turns a stepping wheel a first step during one reciprocating stroke, and a second step in the same direction during an opposite reciprocating stroke in such a manner that the stepping wheel turns different angles during each of the steps.

Another object of the invention is to provide a stepping transmission in which a stepping wheel turns different angles during two opposite reciprocating strokes of a shifting pawl which is actuated by an electromagnetic means for one stroke, and by a spring for the opposite stroke so that the load on the spring means and on the electromagnetic means is different in accordance with the different characteristics of the same.

With these objects in view, the present invention relates to a stepping mechanism which is advantageously applied for driving the register of a counter or meter. One embodiment of the invention comprises actuating means, such as a shifting pawl, having a face extending in a first direction; operating means, preferably including electromagnetic means, for moving the actuating means so that the face of the same moves a predetermined distance in a second direction defining a first angle greater than 90 degrees and less than 180 degrees with the first mentioned direction; and a driven means, for example a stepping wheel having teeth having a part or tooth engageable with the face of the actuating means during movement of the same in the second direction.

When the face of the actuating means or shifting pawl engages the tooth of the stepping wheel, the point of the tooth moves along the face while the stepping wheel turns. The angle of the turning movement of the stepping wheel during movement of the face for the predetermined distance, depends on the angle between the first and second directions. When the angle falls within the above limits the tooth of the stepping wheel moves over an arc which is greater than the distance of movement of the face of the actuating means, and also greater than in constructions in which the angle between the first and second directions is smaller than 90 degrees. The preferred range of the angle between the two directions, is between 100 degrees and 170 degrees, and the greater the angle is chosen, the greater will be the turning angle of the stepping wheel for the same distance of movement of the shifting pawl.

The terms "stepping wheel" and "teeth" are used in the present application to include not only toothed star wheels, but any wheel provided with projections or pins, or pins with rollers thereon, as long as such parts are adapted to move along the face of the shifting pawl of the actuating means.

In accordance with the prior art, the distance along which the projecting parts of the stepping wheel slide or move along to the face of the shifting pawl, was made short in order to reduce the wear of the parts. The present invention is based on the recognition, that it is not necessary to shorten the relative movement of the pawl face and the teeth of the stepping wheel, but that certain angles of the face can be selected in order to influence the transmission ratio between the distance of movement of the shifting pawl and the angle of turning of the stepping wheel. The amount of power required from the operating means, for example from an electromagnetic means, remains the same, but the stepping wheel is turned a greater angle while moving at a greater speed.

In the preferred embodiment of the invention, the shifting pawl is part of the armature of an electromagnetic means and is moved in a forward reciprocating stroke by the electromagnetic means, and in an opposite rearward stroke by a spring. The shifting pawl has two faces which respectively cooperate with teeth of the stepping wheel during the forward and rearward reciprocating strokes, the directions in which the two faces extend defining an angle greater than 90 degrees and smaller than 180 degrees with the direction of movement of the faces. The angle defined by each face of the shifting pawl with the direction of movement of the shifting pawl may be different, in which event the stepping wheel will turn different angles under the control of the two faces.

In a further modified embodiment of the invention, a face of the shifting pawl is angular or curved, so that the angle between the direction of the respective face portion and the direction of movement of shifting pawl varies during movement of the shifting pawl in the same direction. In this event, the speed of turning of the stepping wheel will vary during the angular step performed by the stepping wheel whereby the load on the electromagnetic means moving the shifting pawl varies during the step, and such variation is advantageously selected in accordance with the characteristics of the electromagnetic means which produces different forces as the air gap is decreased during movement of the armature with the shifting pawl.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 1, 2 and 3 are schematic views illustrating possible relative positions between a face of a shifting pawl, and a part of a wheel engaged by the same, FIG. 2 illustrating the arrangement of the invention;

FIG. 4 is a fragmentary schematic view illustrating an embodiment of the invention in the first operational position;

FIG. 5 is a fragmentary schematic view corresponding to FIG. 4 and illustrating another operational position;

FIG. 6 is a schematic view illustrating the geometrical conditions of a stepping transmission according to the present invention; and FIG. 6a is a schematic view illustrating the geometrical conditions of a modified stepping transmission according to the present invention.

Referring now to drawings, and more particularly to FIGS. 1, 2 and 3, a stepping wheel 1, only partly shown, is turnable about an axis 1a, and has about the periphery thereof a plurality of uniformly spaced parts which may be pins, rollers, or pointed teeth, of which only one tooth 1b is shown in two successive positions 1b and 1b'. A shifting pawl 4 is shown in two successive positions 4 and 4' displaced the distance h in a direction D. The shifting pawl 4 has a face 4a which defines different angles with a direction D in the constructions of FIG. 1, FIG. 2 and FIG. 3.

In the construction of FIG. 1, the face 4a extends at 90 degrees to the direction D. In the construction of FIG. 2, the face 4a extends at an angle greater than 90 degrees and smaller than 180 degrees to the direction D. In the construction of FIG. 3, the face 4a extends at an angle smaller than 90 degrees to the direction D.

When pawl 4 is moved the distance h to the position 4' in the direction D in the arrangement of FIG. 1, the face 4a will move a corresponding distance in this direction, and the part or tooth 1b will slide along face 4a, while moving along an arc 2 to the position 1b'. Arc 2 will be greater than the distance h.

In the arrangement of FIG. 3, the part 1b will also slide along the face 4a, but the arc 2 of movement of part 1b to the position 1b' will be shorter than in the arrangement of FIG. 1, and also shorter than the distance h.

In the arrangement of FIG. 2, which is the construction according to the present invention, the arc 2 between the positions 1b and 1b' will be greater than in the arrangement of FIG. 1, and much greater than the distance h. Arc 2 will be further increased if face 4a is inclined a greater angle than shown to the direction D. As illustrated the angle is 120 degrees, and this angle may be increased to almost 180 degrees to increase the turning angle of wheel 1 obtained by shifting pawl 4 the distance h to the position 4'.

It will be appreciated that, assuming that the distance h corresponds to the air gap of an electromagnetic means, the energized electromagnetic means can turn a stepping wheel different angular distances which may be selected to obtain different ratios between the distance h and the angle of turning movement of the stepping wheel 1.

Referring now to FIG. 6, a shifting pawl 4 with a face 4a is schematically indicated. Face 4a extends in the direction F. The shifting pawl 4 may be mounted for turning movement about an axis, not shown, so that the radial vector of the shifting pawl is indicated by $R_1$. Consequently, the direction of movement of face 4a will be perpendicular to radius $R_1$ as indicated by the line D. The angle FD between directions F and D is preferably between 100 degrees and 170 degrees. The angle DF is consequently between 10 degrees and 80 degrees. In the present application, the term "angle between the direction of the face of the shifting pawl and the direction of movement of the shifting pawl" refers to the angle FD which is between 100 degrees and 170 degrees in the preferred embodiment of the invention.

The tooth, pin, or other part 1b of the stepping wheel which is in engagement with the face 4a, has an associated radius $R_2$ defining with the direction F and with face 4a, an angle $FR_2$ which is preferably between 20 degrees and 80 degrees. When face 4a moves in the direction D, part 1b will move along a circular arc 2, as described with reference to FIG. 2. In a modified arrangement shown in FIG. 6a, the face is angular and has two face portions 6a and 6b, inclined different angles to the direction D. However, the angles are nevertheless within the range between 100 degrees and 170 degrees.

In such a modified arrangement, movement of the shifting pawl 4 in the direction D will cause turning movement of the stepping wheel at different speeds while part 1b slides on face portion 6a or on face portion 6b while the shifting pawl 4 moves at the same speed. Consequently, the transmission ratio will be varied during the shifting step of pawl 4. Such a construction may be advantageously used if the operating means of the shifting pawl has a particular force characteristic in which the force acting on the shifting pawl varies during a stroke of the shifting pawl. For example, an electromagnetic means operating shifting pawl 4 will attract its armature with different forces as the width of the air gap is reduced during attraction of the armature. The electromagnetic force acting on the armature is increased in accordance with a square function of the reduction of the air gap and the angles between face portions 6a and 6b and the path of the pawl are correspondingly selected.

FIGS. 4 and 5 illustrate a practical embodiment of the invention. The armature 14 of an electromagnetic means 13 is mounted for turning movement about a pivot 5, and a part of the armature is constructed as a shifting pawl 4. Armature 14 is turned in clockwise direction when electromagnetic means 13 is energized, and is returned in counterclockwise direction by spring 12. Stops 10 and 11 limit the movement of the armature, but are not normally used as will be explained hereinafter.

Armature 14 and shifting pawl 4 constitute an actuating means for a driven stepping wheel 3 which is turnable about an axis 1a.

Shifting pawl 4 has a first face 6 extending in a direction F, and a second face 7 extending in a direction F'. Shifting pawl 4 also has stop faces 8 and 9. In the illustrated positions, face 6 cooperates with tooth 3c, face 8 cooperates with tooth 3d, face 7 cooperates with tooth 3b, and face 9 cooperates with tooth 3a.

During reciprocating movement of armature 14 with shifting pawl 4, faces 6 and 7 move perpendicularly to the radii passing therethrough and through pivot 5 in the directions D, D' which are substantially parallel.

FIG. 4 illustrates the mechanism in a position of rest in which spring 12 has moved armature 14 with shifting pawl 4 to the left to a position in which face 9 abuts tooth 3a, and face 7 abuts the point of tooth 3b. Since two teeth are engaged, stepping wheel 3 is blocked and cannot turn. Stop 11 may be precisely adjusted to engage armature 14 in this position, or may be slightly spaced from the same and only be used for adjustment purposes.

When electromagnetic means 13 is energized, armature 14 is attracted so that the air gap is reduced. Face 6 which extends substantially at an angle of 112 degrees to the direction D moves in a forward stroke in the direction D while engaging the point of tooth 3c whereby the same slides along face 6, as explained with reference to FIGS. 2 and 6 so that stepping wheel 3 is turned a first angular step. This step is terminated when the point of tooth 3d engages stop face 8 in the position shown in FIG. 5.

When electromagnetic means 13 is deenergized, spring 12 is effective to pull armature 14 in an opposite stroke so that face 7 which extends in the direction F' at an angle of substantially 100 degrees to the direction D', engages the point of tooth 3b and turns stepping wheel 3 in the same direction as during the first step until stop face 9 engages tooth 3a and stops the stepping wheel 3. Since the angle FD is greater than the angle F'D' the turning angle of the stepping wheel 3 is greater during the first step than during the second step. This is desirable in view of the fact that the forward stroke of the shifting pawl is effected by a magnetic force according to a non-linear function, whereas the second step is effected by spring 12 in accordance with a linear function of the resilient force.

As explained with reference to FIG. 6a, it is possible to form face 6, or face 7, or both faces of two face portions extending at angles to each other so that the required force is varied during each reciprocating stroke in accordance with the characteristics of the magnetic force and spring force. Instead of two angular faces 6a, 6b as described with reference to FIG. 6a, a continuously curved face may be used.

The ratio between the air gap of the electromagnetic means which corresponds to the movement of the armature with the shifting pawl, and the turning angle of each step of the stepping wheel can be selected by providing different inclinations of the faces 6 and 7 to the direction of movement D or D'. The reverse is also true. Assuming a certain required angular step of the stepping wheel, corresponding to the turning of a register wheel secured thereto through a predetermined angle between digit representing positions, the air gap of the operating magnet 13, 14 can be made smaller if the angle FD is increased within the range between 90 and 180 degrees. Consequently, a smaller air gap can be provided than in the arrangements described with reference to FIGS. 1 and 3. The improved transmission ratio has no influence on the energy required for turning the driven member, such as stepping wheel 3 and a register wheel secured thereto, through the desired angular distance, since a correspondingly greater power is required of the electromagnetic means as the stroke of the armature is shorter.

However, since the magnetic force acting on the armature increases in accordance with a square function as the air gap is reduced, the magnetic force increases much more for a reduced air gap than the force required for turning the stepping wheel by a face inclined at a greater angle to the direction of movement of the armature. Consequently, the efficiency of the electromagnetic means is improved in the arrangement of the invention.

Particularly in arrangements in which the shifting pawl is moved in one stroke by a magnetic force, and in an opposite stroke by a spring force, it is advantageous to construct the faces of the shifting pawl to define different angles with the direction of movement corresponding to the variation of the magnetic force in accordance with a square function, and a variation of the spring force in accordance with a linear function.

It will be understood that each of the elements described above, or two or more together, may also find a useful application in other types of stepping transmissions differing from the types described above.

While the invention has been illustrated and described as embodied in a stepping transmission in which the teeth of a stepping wheel are engaged by a face of a shifting pawl defining an angle greater than 90 degrees with the direction of movement of the shifting pawl, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A stepping transmission comprising, in combination, supporting means; actuating armature means movably mounted on said supporting means and having a face extending in a first direction; electromagnetic operating means for moving said actuating means so that said face moves a predetermined distance in a second direction defining a first angle between 100° and 170° with said first direction; and a driven means turnably mounted on said supporting means and having a part engageable with said face during movement of the same in said second direction so that said part moves along said face while said face moves said distance whereby said driven means turns an angle which depends on the magnitude of said first angle and said part moves over an arc greater than said distance so that the airgap between said electromagnetic means and said actuating armature means is smaller than said arc.

2. A stepping transmission comprising, in combination, supporting means; actuating armature means movably mounted on said supporting means and having a face extending in a first direction; operating means including electromagnetic means connected to said actuating armature means for moving said actuating armature means so that said face moves a distance determined by the air gap of said electromagnetic means in a second direction definnig a first angle between 100° and 170° with said first direction; spring means biasing said actuating means to move in a direction opposite to said second direction; and a driven wheel means turnably mounted on said supporting means and having a part engageable with said face during movement of the same in said second direction so that said part moves along said face while said face moves said distance whereby said driven wheel means turns an angle which depends on the magnitude of said first angle and said part moves over an arc greater than said distance so that the airgap between said electromagnetic means and said actuating armature means is smaller than said arc.

3. A stepping transmission comprising, in combination, supporting means; actuating means including an actuating pawl turnably mounted on said supporting means and having a face extending in a first direction; operating means including electromagnetic means connected to said pawl for moving said pawl so that said face moves a distance determined by the air gap of said electromagnetic means in a second direction defining a first angle between 100° and 170° with said first direction; spring means biassing said pawl to turn in a direction opposite to said direction; and a stepping wheel turnably mounted on said supporting means and having teeth engageable with said face during movement of the same in said second direction so that the engaged tooth moves along said face while said face moves said distance whereby said stepping wheel turns an angle which depends on the magnitude of said first angle and said tooth moves over an arc greater than said distance so that the airgap between said electromagnetic means and said actuating armature means is smaller than said arc.

4. A stepping transmission comprising, in combination, supporting means; actuating armature means movably mounted on said supporting means and having a face extending in a first direction; operating means including electromagnetic means connected to said actuating armature means for moving said actuating armature means so that said face moves a distance determined by the air gap of said electromagnetic means in a second direction defining a first angle between 100° and 170° with said first direction; spring means biassing said actuating armature means to move in a direction opposite to said second direction; and a stepping wheel mounted on said supporting means for turning movement about an axis and having peripheral teeth engageable with said face, a radial vector through said axis and a tooth engaged with said face defining with said face a second angle between 20° and 80°, the engaged tooth moving along said face while said face moves said distance so that said stepping wheel turns an angle which depends on the magnitude of said first angle and said tooth moves over an arc greater than said distance so that the airgap between said electromagnetic means and said actuating armature means is smaller than said arc.

5. A stepping transmission comprising, in combination, supporting means; a shifting pawl mounted on said supporting means for reciprocating movement and having a first face extending in a first direction, and a second face extending in a second direction; operating means for reciprocating said pawl so that said faces reciprocate in opposite strokes a predetermined distance along parallel paths extending in a third direction defining first and second angles between 100° and 170° with said first and second directions; and a stepping wheel mounted on said supporting means for turning movement about an axis and located between said first and second faces, said stepping wheel having teeth engaged by said first face during one reciprocating stroke of said pawl, and by said second face during the opposite stroke of said pawl so that the respective engaged teeth move along said first and second faces, respectively, while the first and second faces move said distance so that said stepping wheel turns two angular steps whose magnitudes depend on the magnitude of said first and second angles, respectively, and the engaged teeth move over arcs greater than said distance.

6. A stepping transmission as set forth in claim 5 wherein said shifting pawl has two stop faces extending in different directions and cooperating with other teeth of said stepping wheel than said first and second faces so as to block turning movement of said stepping wheel after each of said reciprocating strokes of said pawl.

7. A stepping transmission comprising, in combination, supporting means; a shifting pawl mounted on said supporting means for reciprocating movement and having a first face extending in a first direction, and a second face extending in a second direction; operating means including an electromagnetic means and spring means acting in opposite directions on said pawl for reciprocating said pawl so that said faces reciprocate in opposite strokes a predetermined distance along parallel paths extending in a third direction defining different first and second angles between 100° and 170° with said first and second directions, one of said first angles being selected in accordance with the characteristics of said electromagnetic means, and the other first angle selected in accordance with the characteristics of said spring means; and a stepping wheel mounted on said supporting means for turning movement about an axis and located between said first and second faces, said stepping wheel having teeth engaged by said first face during one reciprocating stroke of said pawl, and by said second face during the opposite stroke of said pawl so that the respective engaged teeth move along said first and second faces, respectively, while the first and second faces move said distance so that said stepping wheel turns two angular steps in the same direction whose magnitudes depend on the magnitude of said first and second angles, respectively, and the engaged teeth move over different arcs greater than said distance so that the airgap between said electromagnetic means and said pawl is smaller than the arc of the respective tooth.

8. A stepping transmission comprising, in combination, supporting means; actuating means movably mounted on said supporting means and having a face including two face portions extending at an angle to each other in two first directions; operating means for moving said actuating means so that said face moves a predetermined distance in a second direction defining different first angles between 100° and 170° with said first directions; and a driven stepping wheel turnably mounted on said supporting means and having a part engagable with said face during movement of the same in said second direction so that said part moves along said face portions while said face moves said distance whereby said driven stepping wheel is turned by different forces depending on said first angles while said part moves over an arc greater than said distance.

9. A stepping transmission comprising, in combination, supporting means; actuating means including a pawl turnably mounted on said supporting means and having a face including two face portions extending at an angle to each other in two first directions; operating means including electromagnetic means connected to said pawl for moving said pawl so that said face moves a distance determined by the air gap of said electromagnetic means in a second direction defining different first angles between 100° and 170° with said first directions; spring means biassing said pawl to turn in a direction opposite to said direction; and a stepping wheel turnably mounted on said supporting means and having teeth engageable with said face during movement of the same in said second direction so that the engaged tooth moves along said face portions while said face moves said distance whereby said stepping wheel is turned by different forces depending on said first angles and said tooth moves over an arc greater than said distance so that the airgap between said electromagnetic means and said pawl is smaller than the arc of the respective tooth.

10. A stepping transmission comprising, in combination, supporting means; a shifting pawl mounted on said supporting means for reciprocating movement and having a first face including two face portions extending at an angle to each other in two first directions, and a second face extending in a second direction; operating means for reciprocating said pawl so that said faces reciprocate in opposite strokes a predetermined distance along parallel paths extending in a third direction defining first and second angles between 100° and 170° with said first and second directions; and a stepping wheel mounted on said supporting means for turning movement about an axis and located between said first and second faces, said stepping wheel having peripheral teeth engaged by said first face during one reciprocating stroke of said pawl, and by said second face during the opposite stroke of said pawl so that the respective engaged teeth move along said first and second faces, respectively, while the first and second faces move said distance so that said stepping wheel turns two angular steps whose magnitudes depend on the magnitude of said first and second angles, respectively, and the engaged teeth move over arcs greater than said distance.

11. A transmission as claimed in claim 10 wherein said operating means include an electromagnet and a spring acting on said shifting pawl in opposite directions for reciprocating the same along said path; wherein the angles between said face portions of said first face and said path vary in accordance with the characteristics of said electromagnet to maintain a substantially constant force on teeth engaged by said first face.

References Cited
UNITED STATES PATENTS

| | | | |
|---|---|---|---|
| 1,979,028 | 10/1934 | Ewart | 74—577 |
| 2,555,010 | 5/1951 | Schnabolk | 74—142 |

MILTON KAUFMAN, *Primary Examiner.*